(12) United States Patent
Scherbarth et al.

(10) Patent No.: US 9,571,802 B2
(45) Date of Patent: Feb. 14, 2017

(54) METHOD FOR THE DETECTION OF PULSED LASER RADIATION AND IMAGING LASER ALERTER

(71) Applicant: EADS DEUTSCHLAND GmbH, Ottobrunn (DE)

(72) Inventors: Stefan Scherbarth, Markdorf (DE); Oliver Rudow, Munich (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 482 days.

(21) Appl. No.: 13/935,864

(22) Filed: Jul. 5, 2013

(65) Prior Publication Data
US 2014/0009610 A1    Jan. 9, 2014

(30) Foreign Application Priority Data

Jul. 7, 2012 (EP) .................................... 12005053
Aug. 18, 2012 (EP) .................................... 12005946

(51) Int. Cl.
*G01C 21/02* (2006.01)
*H04N 7/18* (2006.01)
(Continued)

(52) U.S. Cl.
CPC .............. *H04N 7/183* (2013.01); *G01S 3/784* (2013.01); *G01S 7/4804* (2013.01); *G01S 7/4863* (2013.01)

(58) Field of Classification Search
CPC ...... G01S 7/4804; G01S 3/784; G01S 7/4803; H04N 7/183
(Continued)

(56) References Cited

U.S. PATENT DOCUMENTS 4,547,677 A   10/1985   Parker
4,915,498 A *  4/1990   Malek ......................... 356/5.04
(Continued)

FOREIGN PATENT DOCUMENTS

DE         196 21 195      8/1997
DE      1020 007 024 051   11/2008
GB          2 122 833       1/1984

OTHER PUBLICATIONS

M. Lehmann et al., "Smart pixels for Future 3D-TOF sensors," CSEM SA, Photonics Division, Paper ID R28.
(Continued)

*Primary Examiner* — Georgia Y Epps
*Assistant Examiner* — Kevin Wyatt
(74) *Attorney, Agent, or Firm* — Greenblum & Bernstein, P.L.C.

(57) ABSTRACT

Method for detecting pulsed laser radiation having two-dimensional resolution of the direction of incidence with a CCD sensor having an imaging optic. Method includes generating, in signal processing having sampling frequency of at least 5 kHz, single images by comparing each pixel of CCD sensor to respective threshold values and by storing a pixel value exceeding the respective threshold value for an image processing, ascertaining, in the signal processing, a mean or peak value of stored pixel values of the single image pixel-by-pixel over at least 10 samples, forwarding a signal image obtained in signal processing for image processing at image frequency of 10 Hz to 500 Hz, and identifying from signal image, in an image processing, at least one signal pixel representing incident laser radiation. Method further includes determining direction of incidence of laser radiation from position of signal pixels on signal image.

17 Claims, 1 Drawing Sheet

(51) Int. Cl.
    *G01S 3/784*     (2006.01)
    *G01S 7/48*     (2006.01)
    *G01S 7/486*     (2006.01)

(58) Field of Classification Search
    USPC .......................................... 250/206.1, 208.1
    See application file for complete search history.

(56) References Cited

U.S. PATENT DOCUMENTS

| | | | | |
|---|---|---|---|---|
| 5,162,643 | A * | 11/1992 | Currie | G01S 17/42 |
| | | | | 250/206.1 |
| 5,198,657 | A * | 3/1993 | Trost et al. | 250/214 VT |
| 5,280,167 | A | 1/1994 | Dubois | |
| 5,541,726 | A * | 7/1996 | Nakajima | 356/141.1 |
| 5,565,870 | A * | 10/1996 | Fukuhara et al. | 342/70 |
| 6,137,566 | A | 10/2000 | Leonard et al. | |
| 6,638,787 | B1 * | 10/2003 | Buchin et al. | 438/75 |
| 7,397,019 | B1 | 7/2008 | Byars et al. | |
| 7,683,310 | B1 | 3/2010 | Sinclair et al. | |
| 2003/0034501 | A1 * | 2/2003 | Higgins, Jr. | 257/140 |
| 2003/0234349 | A1 * | 12/2003 | Wootton et al. | 250/226 |
| 2007/0103671 | A1 * | 5/2007 | Ash | 356/139.01 |
| 2012/0211665 | A1 * | 8/2012 | Cloud et al. | 250/394 |
| 2013/0153745 | A1 * | 6/2013 | Schmitt et al. | 250/203.2 |

OTHER PUBLICATIONS

European Search Report conducted in counterpart European Appln. No. 12 00 5053-2220 (mailed Jan. 2, 2013).

\* cited by examiner

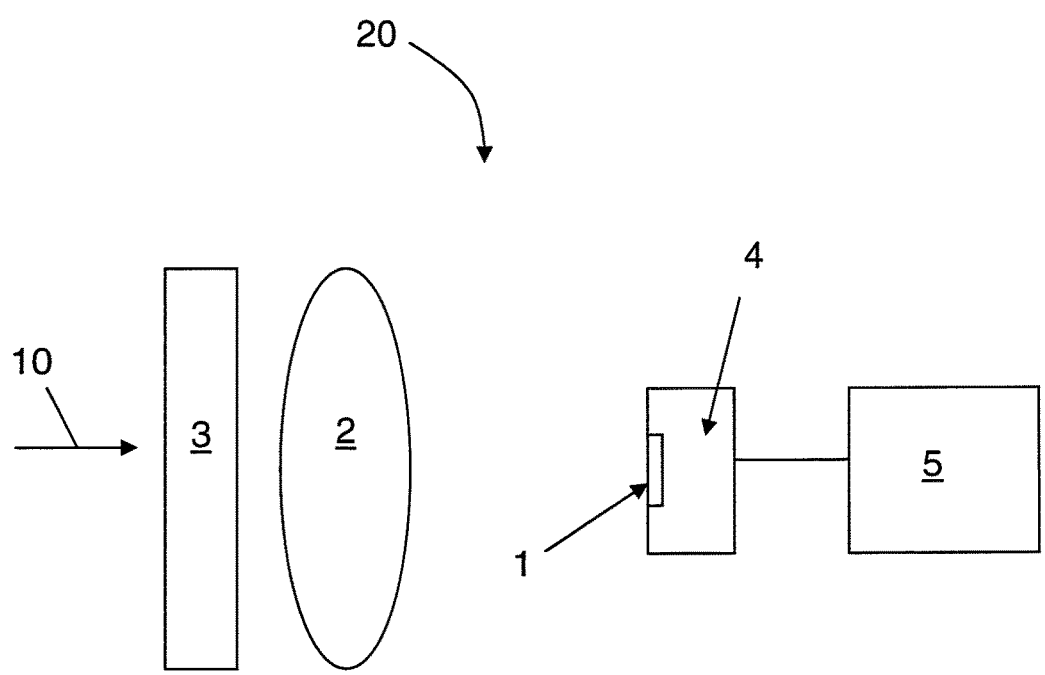

METHOD FOR THE DETECTION OF PULSED LASER RADIATION AND IMAGING LASER ALERTER

CROSS-REFERENCE TO RELATED APPLICATIONS

The present application claims priority under 35 U.S.C. §119(a) of European Patent Application Nos. 12 005 053.9 filed Jul. 7, 2012 and 12 005 946.4 filed Aug. 18, 2013, the disclosures of which are expressly incorporated by reference herein in their entireties.

BACKGROUND OF THE INVENTION

1. Field of the Invention

Embodiments of the invention are directed to a method for detecting pulsed laser radiation and to an imaging laser alerter which implements the method. The method and laser alerter are used for the detection and two-dimensional direction determination of incident, pulsed laser radiation, in particular low intensity pulsed laser radiation, which can be caused, e.g., by steering lasers in laser-controlled guided missiles (beam rider guided missiles).

2. Discussion of Background Information

Beam rider guided missiles represent a high-level military threat. They may be detected early in principle on the basis of the steering laser. However, this is made very difficult because of the very low level of laser pulse energy incident at the target, e.g., on the order of magnitude of several $fJ/cm^2$, which is frequently completely covered by the ambient brightness at least during the day. In addition to the early detection, the precise determination, as much as possible to approximately 1°, of the direction of incidence in azimuth and elevation from which the threat comes is also important for possible countermeasures.

According to the general prior art, large-area photodiodes are used as a detector for beam rider detection. Typically, a high limiting frequency of the detection bandwidth is sought by way of the construction of the photodiodes and by special electronic circuitry. To cover the required overall detection angle, typically a plurality of detection sectors—typically quadrants—are each monitored using one detector.

Due to the large area, the total signal intensity incident on the detector is increased in this case. Due to the high limiting frequency, the best possible separation of the pulse signal of the steering laser from the signal of the background brightness is sought. However, since capacitance increases with the area of the photodiodes and limiting frequency of the detection decreases as a result thereof, the achievable signal-to-background ratio of such a detector is limited in principle.

A further substantial disadvantage of this solution is that precise directional detection is not possible, since the number of detection sectors is kept small to limit the technical expenditure. A further disadvantage is that the suppression of the background signal is only possible to a limited extent, since the background light is accumulated over the entire detection sector of a detector in principle. If the sun is located within this sector, beam rider detection is normally hardly possible here, or is only possible with greatly reduced sensitivity.

In a solution approach known from U.S. Pat. No. 7,683,310 A, it is proposed that the directional precision can be increased by using an array of detectors and simultaneously, by using a plurality of detector layers having wavelength separation. In this manner, additional information can be obtained and additional suppression of the background light can be achieved. The disadvantage here is the immensely growing expenditure for a high angular resolution: thus, for an angle determination to 1° for a half space, an array of approximately 27,000 of these detector elements would be necessary, each in turn having a plurality of photodiode layers and corresponding amplifier electronics.

For improved directional determination, in U.S. Pat. No. 5,280,167 discloses the function of the directional determination and the detection are separated. For the detection, a large-area photodiode that detects over one quadrant in each case is again used. Using the pulses received from this detector, a prediction of the next incoming pulse is then generated in a complex logic circuit (the "code breaker"), which then triggers an image amplifier camera. The laser threat can then be localized with higher location resolution and—in the event of correct pulse prediction—lower background signal in the image of this image amplifier camera. A disadvantage of this assembly is that the detection capability of the photodiode detector is limited in principle, as already described above for the solution of a large-area detector element. A further disadvantage is the high expenditure: In addition to the complex code breaker, an image amplifier camera provided with a closure device ("gate") is required, which additionally only has a small angle of vision to achieve higher location resolutions. As a remedy, it is proposed in U.S. Pat. No. 5,280,167 A that this image amplifier camera be placed on a pivot-tilt head. The expenditure is in turn increased and a time delay arises due to the time required for aligning the pivot-tilt head. The concept is additionally restricted, due to the required pulse prediction, to the detection of accordingly predictable laser threats, which are sufficiently known in their characteristics for this purpose.

SUMMARY OF THE EMBODIMENTS

Embodiments of the invention provide a detection method that has a high sensitivity for detection of beam rider steering lasers even in the case of daylight background and for detection of unknown, non-predictable, pulsed laser threats, that simultaneously allows a two-dimensional directional resolution of the direction of incidence of the laser beam of at least approximately 1°, and that achieves immediate detection without time delay, e.g., due to mechanical detectors to be tracked.

Accordingly, embodiments of the method includes a CCD sensor having an imaging optic used for the detection. In a first signal processing having a sampling frequency of at least 5 kHz, single images are generated by comparing each pixel of the CCD sensor to a threshold value and by storing the pixel value for further processing only if it exceeds the respective threshold value. In the first signal processing, the mean value or peak value of these stored pixel values of a single image is ascertained pixel-by-pixel over at least 10 samples. The signal image thus obtained in the first signal processing is provided at an image frequency of 10 Hz to 500 Hz for a further image processing. In the further image processing, signal pixel(s), which represent(s) the incident laser radiation, is/are identified from the signal image, such that the direction of incidence of the laser radiation results from the position of the signal pixels on the signal image.

Embodiments of the invention are directed to a CCD sensor for use in the method. The CCD sensor includes the first signal processing.

Embodiments of the invention are directed to an imaging laser alerter having a CCD sensor and an assigned imaging optic. The imaging laser alerter includes the first and the further image processing described above.

Embodiments of the present invention are directed to a method for detecting pulsed laser radiation having two-dimensional resolution of the direction of incidence with a CCD sensor having an imaging optic. The method includes generating, in a signal processing having a sampling frequency of at least 5 kHz, single images by comparing each pixel of the CCD sensor to a respective threshold value and by storing a pixel value that exceeds the respective threshold value for an image processing, ascertaining, in the signal processing, a mean value or peak value of the stored pixel values of the single image pixel-by-pixel over at least 10 samples, forwarding a signal image obtained in the signal processing for image processing at an image frequency of 10 Hz to 500 Hz, and identifying from the signal image, in an image processing, at least one signal pixel representing incident laser radiation. The method further includes determining a direction of the incidence of the laser radiation from a position of the signal pixels on the signal image.

According to embodiments of the invention, the method can include continuously deriving from a preceding signal image with respect to time in the image processing, a current threshold value for the comparing in a current signal processing. The current threshold value can be increased or decreased if a fixed span of non-empty signal pixels is exceeded or undershot, respectively, in the signal image.

In accordance with other embodiments, the respective threshold values in the comparing in the first signal processing can be constant over an entirety of the single image.

According to other embodiments of the invention, the respective threshold values in the comparing in the first signal processing may be based on a threshold value image having locally different threshold values. The threshold value image may be continuously obtained in the image processing, in that in the event of local accumulations of signal pixels in the signal image, the respective threshold value is only raised for this image region. Further, the threshold value image can be continuously obtained in the signal processing in that the mean value may be formed from at least two single images which precede the current threshold value comparison with respect to time, and an additional positive value can be added thereto.

In accordance with still other embodiments, the signal processing may be performed in the CCD sensor, and the signal images are read out from the CCD sensor.

Embodiments of the invention are directed to a CCD sensor for use in the above-described method. The CCD sensor includes an image optic. Further, a signal processing having a sampling frequency of at least 5 kHz is performed in the CCD sensor, and the signal processing including generating single images by comparing each pixel of the CCD sensor to a threshold value and by storing the pixel value for further processing when the pixel value exceeds the respective threshold value, ascertaining a mean value or peak value of the stored pixel values of the single image pixel-by-pixel over at least 10 samples, and obtaining a signal image at an image frequency of 10 Hz to 500 Hz.

Embodiments of the invention are directed to an imaging laser alerter for performing the above-described method. The image laser alerter includes a CCD sensor having an assigned imaging optic, the CCD sensor being structured and arranged for signal processing having a sampling frequency of at least 5 kHz, the signal processing including generating single images by comparing each pixel of the CCD sensor to a threshold value and by storing the pixel value for further processing when the pixel value exceeds the respective threshold value, ascertaining a mean value or peak value of the stored pixel values of the single image pixel-by-pixel over at least 10 samples, and obtaining a signal image at an image frequency of 10 Hz to 500 Hz; and an image processing.

According to embodiments, the image laser alerter can further include an objective arranged in front of, with respect to incident pulsed laser radiation, the CCD sensor. The objective can have a high luminosity. Further, an interference or color filter can be arranged in front of, with respect to incident pulsed laser radiation, the objective.

In accordance with still other embodiments of the invention, the signal processing may include near sensor signal processing implemented directly on the CCD sensor.

According to other embodiments, each pixel of the CCD sensor may be read out and compared to the respective threshold value at least every 200 µs.

Moreover, the image processing can include at least one of noise filtering and signature filtering signal processing comprises near sensor signal processing implemented directly on the CCD sensor.

Embodiments of the instant invention are directed to a method for detecting pulsed laser radiation having two-dimensional resolution of the direction of incidence. The method includes receiving pulsed laser radiation on a CCD sensor having an image optic, signal processing the pulsed laser radiation incident on the CCD sensor with a sampling frequency of at least 5 kHz, forwarding a signal image obtained in the signal processing for image processing, image processing at an image frequency of 10 Hz to 500 Hz the signal image to identify at least one signal pixel representing incident laser radiation, and determining a direction of the incident pulsed laser radiation from a position of the signal pixels on the signal image.

According to other embodiments, the signal processing can include comparing each pixel of the CCD sensor to a respective threshold value, and storing a pixel value for each pixel that exceeds the respective threshold value for an image processing, wherein single images are produced. The signal processing may further include ascertaining a mean value or peak value of the stored pixel values of the single images pixel-by-pixel over at least 10 samples.

In accordance with still yet other embodiments of the present invention, the signal processing can further include ascertaining a mean value or peak value of the stored pixel values pixel-by-pixel over at least 10 samples.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

The FIGURE schematically illustrates a construction of a receiving part of a laser alerter according to embodiments of the invention.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

A CCD sensor 1 having an objective 2 of high luminosity, e.g., F1/1.4 in a classical camera construction, is used for the detection and direction determination of incident pulsed laser radiation 10. Spectral filtering using a corresponding interference or color filter 3 can optionally be performed to achieve a first reduction of background intensity. In particular, typical CCD sensors are not capable of detecting the high instantaneous intensity of the pulsed laser against the strong uniform light background of the background, which is, e.g., a sunlit background.

According to the embodiments, a special CCD sensor is used having a first signal processing, also referred to as "near sensor" signal processing, that compares each pixel of the CCD sensor to a threshold value at a high sampling frequency (also referred to as "rapid sampling").

The near-sensor signal processing can be implemented in a particularly advantageous embodiment directly in the CCD sensor, i.e., directly on-chip.

The sampling frequency used according to the embodiments must be at least sufficiently high to avoid saturation of the CCD pixel capacitor within the sampling period. In the case of daylight background, a sampling frequency of at least approximately 5 kHz results therefrom, i.e., each pixel of the CCD sensor is read out and compared to a threshold value at least every 200 µs.

For example, the camera Fastcam IS-1M from Photron, Inc., San Diego, Calif. (www.photron.com), which has an image frequency of 1 MHz at a resolution of 312*260 pixels, shows that the required high sampling rates are achievable using current CCD technology. Princeton Scientific Instruments, Inc., New Jersey, USA (www.prinsci.com) offers a CCD camera having 5 MHz image frequency with the camera PSI-3. It was demonstrated with a prototype of Fraunhofer IMS (annual report 2011, Fraunhofer IMS, pages 47-49) that even shorter read-out times down to 30 ns are possible.

Reference is made, with respect to the practical implementability of the pixel-by-pixel threshold value comparison directly in the CCD sensor provided in the near-sensor signal processing to the "smart pixel" concept demonstrated by M. Lehmann et al., in which an exposure control is performed on a single pixel basis via such a threshold value comparison (M. Lehmann et al., "Smart pixels for Future 3D-TOF sensors," CSEM SA, Photonics Division, Paper ID R28).

The pulsed lasers to be detected typically have a pulse duration in the range of a few tens of nanoseconds. Therefore, the resulting signal-to-background ratio rises with the level of the sampling frequency, up to a sampling frequency in the range of approximately 10 MHz. It is therefore advantageous to choose the sampling frequency as high as possible, preferably greater than 100 kHz.

In the first, near-sensor signal processing 4, the content of the pixel is used for further processing only if the threshold value is exceeded. Such an image provided after the threshold value comparison over all image pixels is referred to as "a single image."

For a first reduction of the data, the individual image data generated according to the sampling frequency are aggregated over a number of n single images to form a signal image, so that this can be performed by averaging or by peak value determination. The number n is selected in this case as a function of the selected high sampling frequency such that an image frequency of the signal images results which can be processed using routine image processing hardware. In the case of rapid sampling at 40 kHz, for example n=200 results in an image frequency of the signal images of 200 Hz. If rapid sampling is performed at 200 kHz, n=2000 results in a signal image frequency of 100 Hz.

The signal images are now read out in accordance with the routine method in CCD camera technology and are used, output via a suitable interface (analog video signal, Camera Link, GigE, USB, etc.), as the input signal of a further signal processing 5. In this further signal processing, the possibly existing signal pixels of a pulsed laser source are then identified in the signal image. The direction of incidence of the laser radiation results from the position of the signal pixel in the signal image. The processing of the image data in the further image processing 5 can be performed using methods known per se in image processing technology, e.g., using further threshold value formation, suitable noise filtering, and possibly additional signature filtering (shape, size, development with respect to time of the signature of the laser radiation in the signal image).

The formation of a threshold value for the threshold value comparison in the first signal processing can be performed during the running monitoring procedure of the laser alerter, so that automatic adaptation to the prevailing radiation conditions is possible.

In an advantageous embodiment, for this purpose, in the further signal processing of the signal images, the threshold values to be used during the rapid sampling are established such that the number of the non-empty pixels in the signal image does not exceed a predefined bandwidth. If this number falls below the bandwidth, the threshold values are decreased for ascertaining the next signal image, if the bandwidth is exceeded, the threshold values are increased. In this manner, the detector is always operated at the detection limit and it is ensured that saturation of the signal image is avoided.

In the simplest case, a global threshold which is equal for all pixels of the image can be used for the threshold value comparison of the rapid sampling.

However, it is particularly advantageous to use a threshold value image for this purpose, so that corresponding to the background brightness of the scene, locally different threshold values are used. This threshold value image can be generated in the image processing of the signal images (i.e., within the further signal processing), in that, for example, in the event of local accumulations of signal pixels, the threshold is only raised for this part of the image.

An embodiment is particularly advantageous in which this threshold value image is respectively carried out continuously in the near-sensor signal processing. To generate the threshold value image, the mean value is formed pixel-by-pixel from at least two single images which precede the current threshold value comparison with respect to time, to which mean value an additional positive value is added.

In this way, false signals in the signal image, due to high background brightnesses, which only change slowly in relation to the rapid sampling frequency are effectively avoided. For example, in the case of a rapid sampling at 200 kHz, if an image averaged over the respective four preceding samples is used as the basis for the threshold value image, non-empty pixels will only be present in the signal image if a significant change—which is established by the additional added value—of the light intensity of the pixels existed within the sampling period of 5 μs. All changes which run more slowly than 20 μs are filtered out with high effectiveness by the described use of the threshold value image. Since intensities in the natural scene backgrounds, e.g., sun reflections in the water, typically change significantly more slowly, effective false signal suppression is therefore achieved in the near-sensor signal processing.

Extremely high data rates arise due to the rapid sampling of the first, near-sensor signal processing. It is therefore advantageous, as described above, to integrate this near-sensor signal processing directly into the CCD sensor chip. Only the signal images incident at the routine data rates (for typical CCD cameras) must therefore be read out from the CCD sensor chip.

As an alternative to an implementation of the near-sensor signal processing directly on the CCD sensor chip, the near-sensor signal processing can also be implemented solely digitally on the basis of available FPGA technology, e.g., from Xilinx Inc., San Jose, Calif., in conjunction with a rapid datalink. Of course, the use of a plurality of parallel data links is also possible in this context.

In summary, the following are the essential advantages of the invention:
high sensitivity for the detection of beam rider steering lasers even in the case of daylight background,
detection of unknown, non-predictable, pulsed laser threats,
two-dimensional directional resolution of the direction of incidence of the laser radiation of at least approximately 1°,
rapid detection without time delays as a result, for example, due to detectors to be mechanically tracked.

A laser alerter implemented on the basis of the present embodiments is distinguished in particular by its compact construction.

Exemplary Embodiment

In an exemplary embodiment, a CCD sensor having 256*256 pixel resolution and 50 μm pixel grid is used (e.g., a CMOS-CCD). With an objective of 8 mm focal width, an aperture angle of 92° results vertically and horizontally. The detection angle per pixel is 0.36°, whereby the sought angular resolution of better than 1° may be achieved well.

In the case of an aperture of the objective of 1/1.4, it collects approximately $10^4$ photons per pulse at a laser wavelength lying in the near infrared at an incident pulse energy density of 10 fJ/cm$^2$. In the least favorable case—focusing on the pixel corners—these photons can be distributed onto 4 pixels. In this manner, approximately 2500 photons are incident on one pixel, an order of magnitude which can be detected well using CCD sensors. The sought detection sensitivity is therefore achieved.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for detecting pulsed laser radiation having two-dimensional resolution of the direction of incidence with a CCD sensor having an imaging optic, comprising:
generating, in a signal processing having a sampling frequency of at least 5 kHz, single images by comparing each pixel of the CCD sensor to a respective threshold value and by storing a pixel value that exceeds the respective threshold value for an image processing;
ascertaining, in the signal processing, a mean value or peak value of the stored pixel values of the single image pixel-by-pixel over at least 10 samples;
forwarding a signal image obtained in the signal processing for image processing at an image frequency of 10 Hz to 500 Hz;
identifying from the signal image, in an image processing, at least one signal pixel representing incident laser radiation; and
determining a direction of the incidence of the laser radiation from a position of the signal pixels on the signal image.

2. The method according to claim 1, wherein the respective threshold values in the comparing in the first signal processing are constant over an entirety of the single image.

3. The method according to claim 1, wherein the respective threshold values in the comparing in the first signal processing are based on a threshold value image having locally different threshold values.

4. The method according to claim 3, wherein the threshold value image is continuously obtained in the image processing, in that in the event of local accumulations of signal pixels in the signal image, the respective threshold value is only raised for this image region.

5. The method according to claim 1, wherein the signal processing is performed in the CCD sensor, and the signal images are read out from the CCD sensor.

6. A CCD sensor for use in the method of claim 1, comprising:
an image optic,
wherein a signal processing having a sampling frequency of at least 5 kHz is performed in the CCD sensor, and the signal processing including generating single images by comparing each pixel of the CCD sensor to a threshold value and by storing the pixel value for further processing when the pixel value exceeds the respective threshold value, ascertaining a mean value or peak value of the stored pixel values of the single image pixel-by-pixel over at least 10 samples, and obtaining a signal image at an image frequency of 10 Hz to 500 Hz.

7. An imaging laser alerter for performing the method of claim 1, the image laser alerter comprising:
a CCD sensor having an assigned imaging optic, the CCD sensor being structured and arranged for signal processing having a sampling frequency of at least 5 kHz, the signal processing including generating single images by comparing each pixel of the CCD sensor to a threshold value and by storing the pixel value for further processing when the pixel value exceeds the respective threshold value, ascertaining a mean value or peak value of the stored pixel values of the single image pixel-by-pixel over at least 10 samples, and obtaining a signal image at an image frequency of 10 Hz to 500 Hz; and an image processing.

8. The imaging laser alerter according to claim 7, further comprising an objective arranged in front of, with respect to incident pulsed laser radiation, the CCD sensor.

9. The imaging laser alerter according to claim 8, wherein the objective has a high luminosity.

10. The imaging laser alerter according to claim 8, further comprising an interference or color filter in front of, with respect to incident pulsed laser radiation, the objective.

11. The imaging laser alerter according to claim 7, wherein the signal processing comprises near sensor signal processing implemented directly on the CCD sensor.

12. The imaging laser alerter according to claim 7, wherein each pixel of the CCD sensor is read out and compared to the respective threshold value at least every 200 µs.

13. The imaging laser alerter according to claim 7, wherein the image processing comprises at least one of noise filtering and signature filtering signal processing comprises near sensor signal processing implemented directly on the CCD sensor.

14. A method for detecting pulsed laser radiation having two-dimensional resolution of the direction of incidence with a CCD sensor having an imaging optic, comprising:
generating, in a signal processing having a sampling frequency of at least 5 kHz, single images by comparing each pixel of the CCD sensor to a respective threshold value and by storing a pixel value that exceeds the respective threshold value for an image processing;
ascertaining, in the signal processing, a mean value or peak value of the stored pixel values of the single image pixel-by-pixel over at least 10 samples;
forwarding a signal image obtained in the signal processing for image processing at an image frequency of 10 Hz to 500 Hz;
identifying from the signal image, in an image processing, at least one signal pixel representing incident laser radiation;
determining a direction of the incidence of the laser radiation from a position of the signal pixels on the signal image; and
continuously deriving from a preceding signal image with respect to time in the image processing, a current threshold value for the comparing in a current signal processing, wherein the current threshold value is increased or decreased if a fixed span of non-empty signal pixels is exceeded or undershot, respectively, in the signal image.

15. A method for detecting pulsed laser radiation having two-dimensional resolution of the direction of incidence with a CCD sensor having an imaging optic, comprising:
generating, in a signal processing having a sampling frequency of at least 5 kHz, single images by comparing each pixel of the CCD sensor to a respective threshold value and by storing a pixel value that exceeds the respective threshold value for an image processing;
ascertaining, in the signal processing, a mean value or peak value of the stored pixel values of the single image pixel-by-pixel over at least 10 samples;
forwarding a signal image obtained in the signal processing for image processing at an image frequency of 10 Hz to 500 Hz;
identifying from the signal image, in an image processing, at least one signal pixel representing incident laser radiation; and
determining a direction of the incidence of the laser radiation from a position of the signal pixels on the signal image,
wherein the respective threshold values in the comparing in the first signal processing are based on a threshold value image having locally different threshold values,
wherein the threshold value image is continuously obtained in the signal processing in that the mean value is formed from at least two single images which precede the current threshold value comparison with respect to time, and an additional positive value is added thereto.

16. A method for detecting pulsed laser radiation having two-dimensional resolution of the direction of incidence, comprising:
receiving pulsed laser radiation on a CCD sensor having an image optic;
signal processing the pulsed laser radiation incident on the CCD sensor with a sampling frequency of at least 5 kHz;
forwarding a signal image obtained in the signal processing for image processing;
image processing at an image frequency of 10 Hz to 500 Hz the signal image to identify at least one signal pixel representing incident laser radiation; and
determining a direction of the incident pulsed laser radiation from a position of the signal pixels on the signal image,
wherein the signal processing comprises:
comparing each pixel of the CCD sensor to a respective threshold value; and
storing a pixel value for each pixel that exceeds the respective threshold value for
an image processing,
wherein single images are produced, and
wherein the signal processing further comprises ascertaining a mean value or peak value of the stored pixel values of the single images pixel-by-pixel over at least 10 samples.

17. A method for detecting pulsed laser radiation having two-dimensional resolution of the direction of incidence, comprising:
receiving pulsed laser radiation on a CCD sensor having an image optic;
signal processing the pulsed laser radiation incident on the CCD sensor with a sampling frequency of at least 5 kHz;
forwarding a signal image obtained in the signal processing for image processing;
image processing at an image frequency of 10 Hz to 500 Hz the signal image to identify at least one signal pixel representing incident laser radiation; and
determining a direction of the incident pulsed laser radiation from a position of the signal pixels on the signal image,
wherein the signal processing further comprises ascertaining a mean value or peak value of the stored pixel values pixel-by-pixel over at least 10 samples.

* * * * *